United States Patent
Nakamura

(10) Patent No.: US 8,396,505 B2
(45) Date of Patent: Mar. 12, 2013

(54) RADIO COMMUNICATION SYSTEM, NETWORK SIDE DEVICE, SMALL CELL BASE STATION, AND TRANSMISSION POWER CONTROL METHOD

(75) Inventor: Kazutaka Nakamura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 340 days.

(21) Appl. No.: 12/897,682

(22) Filed: Oct. 4, 2010

(65) Prior Publication Data

US 2011/0086665 A1    Apr. 14, 2011

Related U.S. Application Data

(60) Provisional application No. 61/248,359, filed on Oct. 2, 2009.

(51) Int. Cl.
*H04B 7/00* (2006.01)

(52) U.S. Cl. ............... 455/522; 455/63.1; 455/67.11; 455/67.13; 455/422.1; 455/436; 370/342; 370/335; 370/336; 370/337; 370/338; 370/339; 370/340; 370/341; 370/465

(58) Field of Classification Search .......... 455/63.1, 455/67.11, 67.13, 522, 422.1, 436; 370/342, 370/335, 336, 337, 338, 339, 340, 341, 465
See application file for complete search history.

(56) References Cited

U.S. PATENT DOCUMENTS

| | | | |
|---|---|---|---|
| 6,453,166 B1* | 9/2002 | Ishikawa et al. | 455/450 |
| 7,305,247 B2* | 12/2007 | Sato et al. | 455/525 |
| 7,483,712 B2* | 1/2009 | Komatsu | 455/522 |
| 2004/0102194 A1* | 5/2004 | Naghian et al. | 455/436 |
| 2004/0176097 A1* | 9/2004 | Wilson et al. | 455/452.2 |
| 2004/0229603 A1* | 11/2004 | Sato et al. | 455/422.1 |
| 2005/0130662 A1* | 6/2005 | Murai | 455/444 |
| 2008/0146154 A1* | 6/2008 | Claussen et al. | 455/63.1 |
| 2009/0011770 A1* | 1/2009 | Jung et al. | 455/452.1 |
| 2009/0176479 A1* | 7/2009 | Vikberg et al. | 455/406 |
| 2010/0309996 A1* | 12/2010 | Lim et al. | 375/260 |
| 2012/0129527 A1* | 5/2012 | Takeuchi et al. | 455/436 |
| 2012/0142364 A1* | 6/2012 | Duan | 455/450 |

OTHER PUBLICATIONS

3GPP TR 25.967 8.0.1 (Mar. 2009), 3$^{rd}$ Generation Partnership Project, Technical Specification Group Radio Access Networks, Home Node B Radio Frequency (RF) Requirements (FDD) (Release 8).

* cited by examiner

*Primary Examiner* — Temesgh Ghebretinsae
*Assistant Examiner* — MD Talukder
(74) *Attorney, Agent, or Firm* — Duane Morris LLP

(57) ABSTRACT

A large cell base station 100 according to an embodiment is configured to form a large cell and includes: an upper-limit value determination unit 124 configured to determine an upper-limit value $I^{cap}$ of an amount of interference which is received by the large cell base station from each of the radio terminals based on a permissible value $I^{total}$ of a total amount of interference which is received by the large cell base station from the radio terminals and the number of the small cell base stations within the large cell; and a wired communication unit 140 configured to transmit upper-limit value information indicating the upper-limit value $I^{cap}$ determined by the upper-limit value determination unit 124 to the small cell base stations.

8 Claims, 11 Drawing Sheets

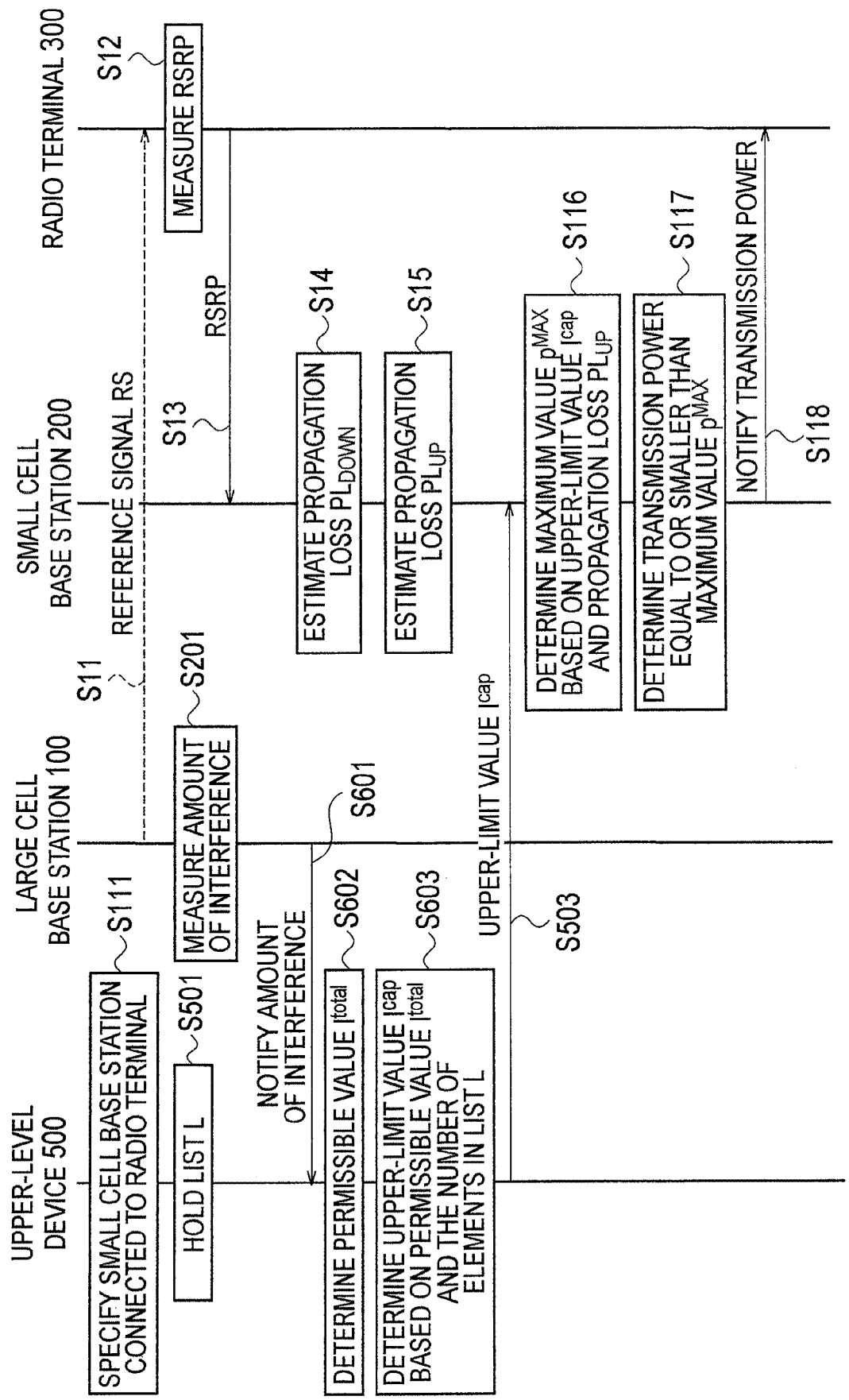

RADIO COMMUNICATION SYSTEM, NETWORK SIDE DEVICE, SMALL CELL BASE STATION, AND TRANSMISSION POWER CONTROL METHOD

CROSS-REFERENCE TO RELATED APPLICATION

This application claims the benefit of priority under 35 U.S.C. section 119 of U.S. Provisional Application No. 61/248,359 filed Oct. 2, 2009, the disclosure of which is incorporated herein by reference in its entirety.

BACKGROUND OF THE INVENTION

1. Field of the Invention

The present invention relates to a radio communication system, a network side device, a small cell base station, and a transmission power control method with which uplink transmission power of a radio terminal connected to a small cell base station is controlled.

2. Description of the Related Art

Recently, a small cell base station has attracted an attention. The small cell base station is a small-sized base station which forms a small cell of a communication area with a radius of several to several tens of meters and is capable of being installed indoor. Installing small cell base stations makes it possible to disperse the traffic of a large cell base station forming a large cell of a communication area with a radius of several hundreds of meters and to cover a dead area inside the large cell.

The installation places of large cell base stations are decided by a carrier in consideration of inter-cell interference. On the other hand, a user can install a small cell base station in any place. For this reason, there is a case where a small cell base station is installed within a large cell which is formed by a large cell base station.

Under the above-described circumstance, when a radio terminal (hereinafter referred to as "small cell terminal" as needed) which is connected to the small cell base station performs communications using the same frequency band as that of a radio terminal which is connected to the large cell base station, the large cell base station receives interference from the small cell terminal. As a result, a communication rate of the radio terminal which is connected to the large cell base station is decreased.

The following uplink transmission power control method of suppressing the interference from the small cell terminal to the large cell base station has been proposed (Non-Patent Literature 1). In the method disclosed in Non-Patent Literature 1, an upper-limit value of an amount of interference from the small cell terminal to the large cell terminal is set in a small cell base station in advance. The small cell base station determines a maximum value of transmission power of the small cell terminal according to the upper-limit value and a propagation loss from the small cell terminal to the large cell base station and controls the transmission power of the small cell terminal so that the transmission power should not exceed the determined maximum value.

Non-Patent Literature 1: 3GPP TR25.967, "Home Node B Radio Frequency (RF) Requirements (FDD)", Section 7.3, "Control of HNB uplink interference", March 2009.

SUMMARY OF THE INVENTION

As described above, a small cell base station can be installed by a user as needed and the number of small cell base stations within a large cell may be changed.

However, the method disclosed in Non-Patent Literature 1 does not take into consideration the case where the number of small cell base stations within the large cell changes. Thus, the following problem occurs. Specifically, when the number of the small cell base stations within the large cell is increased, an amount of interference from the small cell terminal to the large cell base station is increased. As a result, there is a problem that a communication rate of the radio terminal to be connected to the large cell base station is largely decreased.

Accordingly, an objective of the present invention is to provide a radio communication system, a network side device, a small cell base station, and a transmission power control method with which a decrease of a communication rate of a radio terminal connected to a large cell base station can be suppressed even when the number of small cell base stations within a large cell changes.

To solve the above-described problem, the present invention includes the following aspects. A first aspect of the present invention is a radio communication system (a radio communication system 1) in which a plurality of small cell base stations (small cell base stations 200) are installed within a large cell (large cell LC) formed by a large cell base station (large cell base station 100) and each are configured to form a small cell (small cell SC) smaller than the large cell, and the small cell base stations are configured to control transmission powers of radio terminals (radio terminal 300) connected to the small cell base stations, wherein a network side device that is formed of at least one of the large cell base station and an upper-level device (an upper-level device 500) of the large cell base station includes: an upper-limit value determination unit (upper-limit value determination unit 124) configured to determine an upper-limit value (upper-limit value $I^{cap}$) of an amount of interference which is received by the large cell base station from each of the radio terminals based on a permissible value (permissible value $I^{total}$) of a total amount of interference which is received by the large cell base station from the radio terminals and the number of the small cell base stations within the large cell; and a transmitter (wired communication unit 140) configured to transmit upper-limit value information indicating the upper-limit value determined by the upper-limit value determination unit to the small cell base stations, and the small cell base stations each includes: a receiver (wired communication unit 240) configured to receive the upper-limit value information from the network side device; a maximum value determination unit (maximum value determination unit 222) configured to determine a maximum value (maximum value $p^{MAX}$) of transmission power of a corresponding one of the radio terminals based on the upper-limit value information received by the receiver and a propagation loss value (propagation loss value $PL_{UP}$) indicating a propagation loss from the corresponding one of the radio terminals to the large cell base station; and a transmission power controller (transmission power controller 223) configured to control transmission power of the corresponding one of the radio terminals so the transmission power does not exceed the maximum value determined by the maximum value determination unit. The propagation loss means herein a combination of range attenuation, a shadowing loss, and a planimetric insertion loss.

With the aspect, an upper-limit value of an amount of interference which is received by the large cell base station from each of the small cell terminals is determined based on a permissible value of the total amount of interference which is received by the large cell base station from the radio terminals (i.e., a small cell terminal) connected to the small cell base stations and the number of the small cell base stations within the large cell. The small cell base station determines a maximum value of transmission power of the small cell terminal according to the upper-limit value and the propagation loss from the small cell terminal to the large cell base station and controls the transmission power of the small cell terminal so the transmission power does not exceed the determined maximum value.

Consequently, even when the number of the small cell base stations within the large cell is changed, an amount of interference from the small cell terminal to the large cell base station can be kept equal to or smaller than the permissible value and the decrease of the transmission rate of the radio terminal connected to the large cell base station can be suppressed.

A second aspect of the present invention is according to the first aspect and is summarized in that the upper-limit value determination unit determines, as the upper-limit value, a result of dividing the permissible value of the total amount of interference by the number of the small cell base stations having a connected radio terminal among all the small cell base stations within the large cell.

A third aspect of the present invention is according to the first aspect and is summarized in that the upper-level device manages information on an installation status of the small cell base stations and information on a communication status of the small cell base stations, and the network side device includes an acquisition unit (acquisition unit 121) which acquires information on the number of the small cell base stations within the large cell using the information which is managed by the upper-limit device.

A fourth aspect of the present invention is according to the first aspect and is summarized in that the large cell base station includes an interference measurement unit (interference measurement unit 122) which measures the total amount of interference which is received by the large cell base station, and the network side device includes a permissible value determination unit (permissible value determination unit 123) which determines the permissible value of the total amount of interference based on a measured value obtained by the interference measurement unit.

A fifth aspect of the present invention is according to the first aspect and is summarized in that the upper-limit value determination unit determines, as the upper-limit value, a result of dividing the permissible value of the total amount of interference by a multiplication result of the number of all the small cell base stations within the large cell and a coefficient indicating a proportion of the small cell base station having a connected radio terminal to all the small cell base stations within the large cell.

A sixth aspect of the present invention is according to the first aspect and is summarized in that the small cell base stations each transmits the propagation loss value to the network side device, the network side device receives the propagation loss values from the small cell base stations, and the upper-limit value determination unit determines the upper-limit value based on the permissible value of the total amount of interference, the number of the small cell base stations within the large cell, and the propagation loss values received from the small cell base stations.

A seventh aspect of the present invention is a network side device which is formed of at least one of a large cell base station and an upper-level device of the large cell base station in a radio communication system in which a plurality of small cell base stations each forming a small cell smaller than a large cell formed by the large cell base station are installed within the large cell and the small cell base stations control transmission powers of radio terminals connected to the small cell base stations, the network side device comprising: an upper-limit value determination unit configured to determine an upper-limit value of an amount of interference which is received by the large cell base station from each of the radio terminals based on a permissible value of a total amount of interference which is received by the large cell base station from the radio terminals and the number of the small cell base stations within the large cell; and a transmitter configured to transmit upper-limit value information indicating the upper-limit value determined by the upper-limit value determination unit to the small cell base stations.

A eighth aspect of the present invention is a small cell base station which forms a small cell smaller than a large cell formed by a large cell base station and is installed within the large cell, comprising: a receiver configured to receive upper-limit value information from a network side device which is formed of at least one of the large cell base station and an upper-level device of the large cell base station; a maximum value determination unit configured to determine a maximum value of transmission power of a radio terminal based on the upper-limit value information received by the receiver and a propagation loss value indicating a propagation loss from the radio terminal connected to the small cell base station to the large cell base station; and a transmission power controller configured to control transmission power of the radio terminal so that the transmission power does not exceed the maximum value determined by the maximum value determination unit, wherein the upper-limit value information indicates an upper-limit value of an amount of interference which is received by the large cell base station from one radio terminal, and the upper-limit value is determined based on a permissible value of a total amount of interference which is received by the large cell base station from radio terminals connected to the small cell base station within the large cell and the number of small cell base stations within the large cell.

A ninth aspect of the present invention is a transmission power control method of controlling transmission powers of radio terminals connected to small cell base stations in a radio communication system in which each of the small cell base stations forms a small cell smaller than a large cell formed by a large cell base station and the small cell base stations are installed within the large cell, comprising the steps of: determining, by a network side device which is formed of at least one of the large cell base station and an upper-level device of the large cell base station, an upper-level value of an amount of interference which is received by the large cell base station from each of the radio terminals based on a permissible value of a total amount of interference which is received by the large cell base station from the radio terminals and the number of the small cell base stations within the large cell; and transmitting upper-limit value information indicating the determined upper-limit value from the network side device to the small cell base stations, and receiving, by the small cell base stations, the upper-limit value information from the network side device; determining, by the small cell base stations, a maximum value of transmission powers of the respective radio terminals based on the received upper-limit value information and a propagation loss value indicating a propagation loss from the respective radio terminals to the large cell base station; and controlling, by the small cell base stations, transmission power of each of the radio terminals so that the transmission power does not exceed the determined maximum value.

The present invention can provide a radio communication system, a network side device, a small cell base station, and a transmission power control method with which a decrease of a communication rate of a radio terminal connected to a large cell base station can be suppressed even when the number of small cell base stations within a large cell is changed.

BRIEF DESCRIPTION OF THE DRAWINGS

FIG. 11 is a sequence diagram showing an operation pattern 2 according to the first embodiment of the present invention.

DESCRIPTION OF THE EMBODIMENTS

Figure 1:
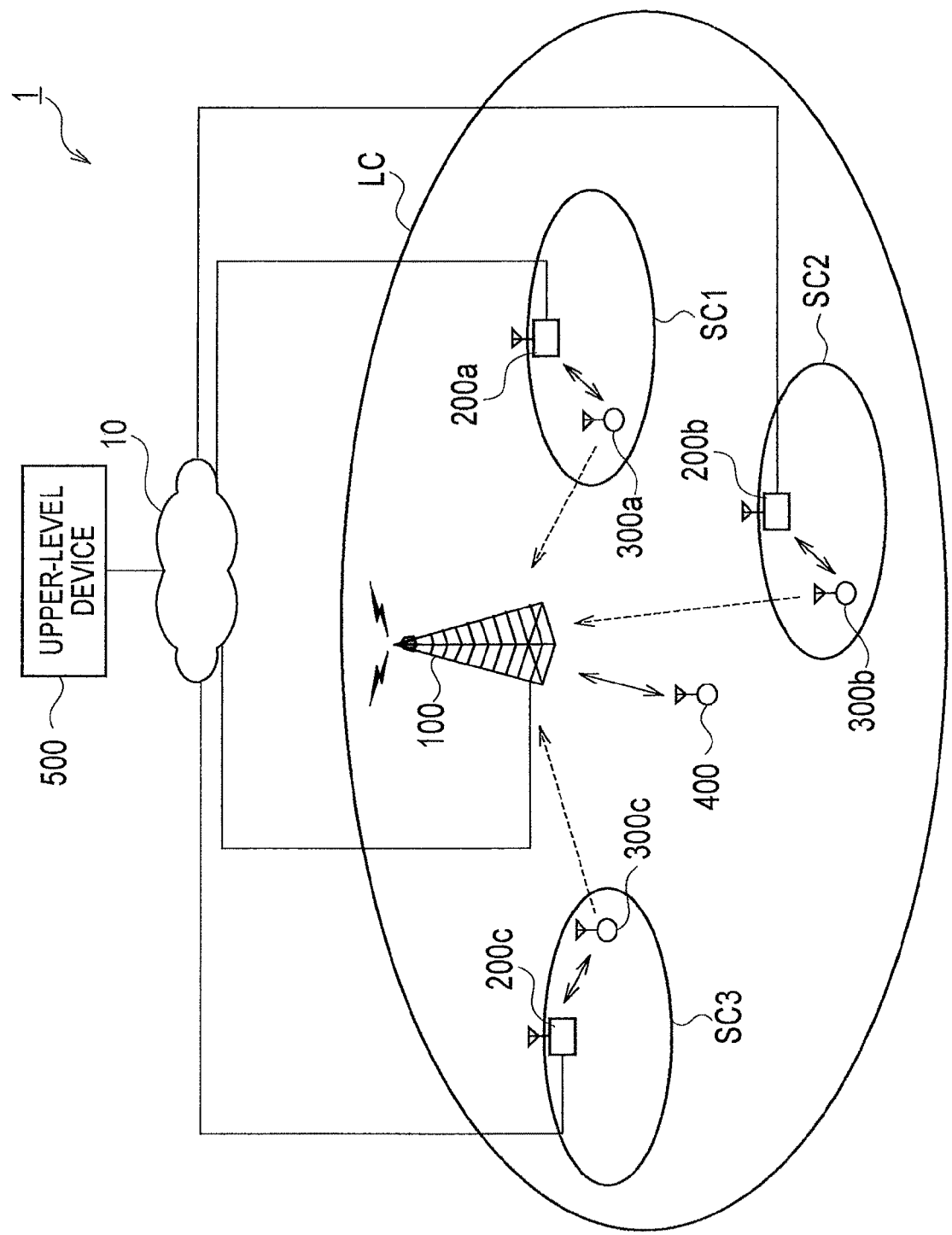
FIG. 1 is a schematic configuration diagram of a radio communication system according to first and second embodiments of the present invention.

Hereinafter, embodiments of the present invention are described by referring to the drawings. In the description of the drawings in the following embodiments, same or similar portions are given the same or similar reference symbols.

(1) First Embodiment

In the following first embodiment, (1.1) Schematic Configuration of Radio Communication System, (1.2) Detailed Configuration of Radio Communication System, (1.3) Operation of Radio Communication System, and (1.4) Effects of First Embodiment are described.
(1.1) Schematic Configuration of Radio Communication System FIG. 1 is a schematic configuration diagram of a radio communication system 1 according the first embodiment. The radio communication system 1 has, for example, a configuration based on LIE Release 9 which is the 3.9th generation (3.9G) mobile phone system or a configuration based on LTE-Advanced which is positioned as the fourth generation (4G) mobile telephone system.

As shown in FIG. 1, the radio communication system 1 includes a large base station 100 forming a large cell LC and small cell base stations 200a to 200c which respectively form small cells SC1 to SC3. It should be noted that the number of the small cell base stations in the large cell LC is not limited to the number shown in FIG. 1 but changes with time because a user installs the small cell base stations as needed.

The large cell LC is a communication area with a radius of approximately several hundreds of meters, for example, and is referred to as a macro-cell. Each of the small cells SC1 to SC3 is a communication area with a radius of approximately several to several tens of meters and is referred to as a femto cell. It should be noted that in the LIE and the LIE-Advanced, the small cell base station is referred to as a home eNodeB (HeNB) and the large cell is referred to as a macro eNodeB (MeNB).

The small cell base station 200a is in connection with a radio terminal 300a. The small cell base station 200b is in connection with a radio terminal 300b. The small cell base station 200c is in connection with a radio terminal 300c. The large cell base station 100 is in connection with a radio terminal 400. In the first embodiment, the large cell base station 100 forms a network-side device.

The small cell base station 200a controls transmission power of the radio terminal 300a. The small cell base station 200b controls transmission power of the radio terminal 300b. The small cell base station 200c controls transmission power of the radio terminal 300c.

It should be noted that the small cells SC1 to SC3 are simply referred to as "small cell SC" when they are not distinguished; the small cell base stations 200a to 200a are simply referred to as "small cell base station 200" when they are not distinguished; and the radio terminals 300a to 300c are simply referred to as "radio terminal 300" when they are not distinguished.

The small cell base station 200 is configured to be small enough to be installed by a user in any place (specifically indoor). The small cell base station 200 is installed inside the large cell LC to disperse the traffic of the large cell base station 100 and cover a dead area inside the large cell LC.

The small cell base station 200 and the large cell base station 100 are connected to a core network 10 which is a wired communication network. The core network 10 is provided by a carrier and is formed of a router and the like which are not shown.

The core network 10 has an upper-level device (host device) 500 connected thereto. The upper-level device 500 is a device capable of transmitting and receiving a control signal to and from the large cell base station 100 and the small cell base station 200. The upper-level device 500 manages information on an installation status of the small cell base station 200 and information on communication statuses of the large cell base station 100 and the small cell base station 200. In the LTE and the LTE-Advanced, the upper-level device 500 serves as MME (Mobility Management Entity) or a servicing gateway.

When the small cell base station 200 and the radio terminal 300 use, for communications, the same frequency band as that of the large cell base station 100 and the radio terminal 400, radio signals transmitted by the radio terminal 300 interfere the large cell base station 100. In the example of FIG. 1, radio signals to be transmitted by the radio terminal 300 interfere the large cell base station 100. As a result, an uplink communication rate between the radio terminal 400 and the large cell base station 100 is decreased.

The small cell base station 200 controls the transmission power of the radio terminal 300 so that a total amount of interference which is received by the large cell base station 100 from the radio terminal 300 becomes equal to or smaller than a predetermined amount using a method described later.
(1.2) Detailed Configuration of Radio Communication System Hereinafter, the detailed configuration of the radio communication system 1 is described.
(1.2.1) Configuration of Large Cell Base Station FIG. 2 is a block diagram showing a configuration of the large cell base station 100.

Figure 2:
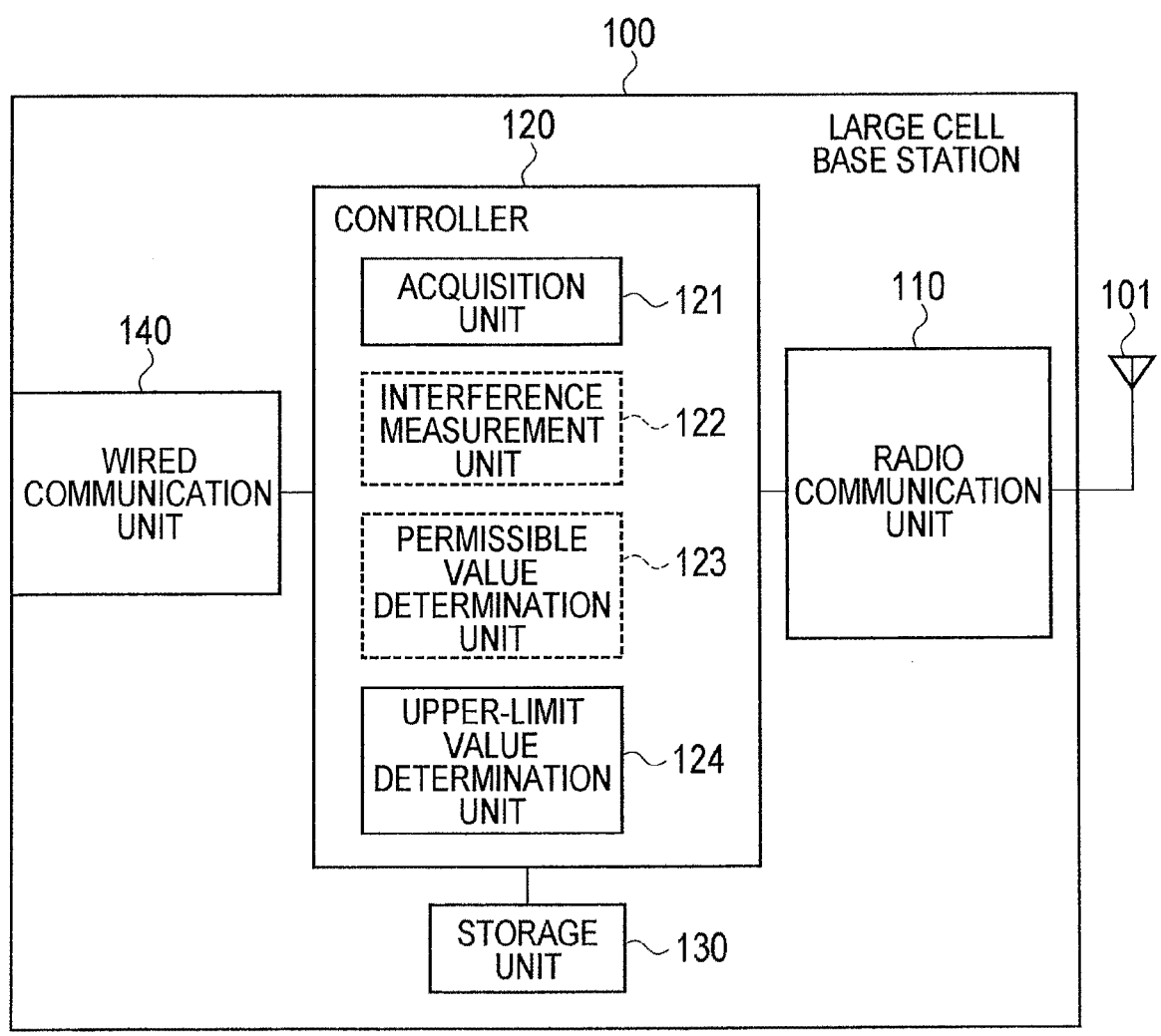
FIG. 2 is a block diagram showing a configuration of a large cell base station according to the first embodiment.

As shown in FIG. 2, the large cell base station 100 includes an antenna unit 101, a radio communication unit 110, a controller 120, a storage unit 130, and a wired communication unit 140.

The radio communication unit 110 is formed of, for example, a radio frequency (RF) circuit and a base band (BB) circuit and transmits and receives a radio signal to and from the radio terminal 400. In addition, the radio communication unit 110 performs coding and modulation of a transmission signal and demodulation and decoding of a reception signal.

The controller 120 is configured of, for example, a CPU and controls various functions included in the large cell base station 100. The storage unit 130 is configured of, for example, a memory and stores various pieces of information to be used for controlling the large cell base station 100. The wired communication unit 140 performs communications with another large cell base station or the small cell base station 200 through the core network 10.

The controller 120 has an acquisition unit 121 and an upper-limit value determination unit 124.

The acquisition unit 121 acquires a permissible value (hereinafter, a permissible value $I^{total}$) of the total amount of interference which is received by the large cell base station 100 from the radio terminal 300 and the number of the small cell base stations 200 within the large cell LC (hereinafter, the number of the small cell base stations). When the permissible value $I^{total}$ is fixed and is stored in the storage unit 130, the acquisition unit 121 acquires the permissible value $I^{total}$ from the storage unit 130. The acquisition unit 121 acquires the number of the small cell base stations using a list created by the upper-level device 500. The details of the list are described later.

The interference amount means herein an interference amount per resource block (RB) which is an allocation unit of a radio resource. The interference amount may be an IoT (Interference over Thermal) which is a ratio of interference power to noise power.

The controller 120 may include an interference measurement unit 122 and permissible value determination unit 123 so that the permissible value can be variable. The interference measurement unit 122 measures a total amount of interference which is received by the large cell base station 100. The permissible value determination unit 123 determines a permissible value $I^{total}$ based on the measured value obtained by the interference measurement unit 122. The above-mentioned method is described later in detail.

The upper-limit value determination unit 124 determines an upper-limit value (hereinafter, an upper-limit value $I^{cap}$) of an amount of interference which is received by the large cell base station 100 from one radio terminal 300 based on the permissible value $I^{total}$ and the number of the small cell base stations. The method of determining the upper-limit value $I^{cap}$ is described later in detail.

The wired communication unit 140 transmits upper-limit value information indicating the upper-limit value $I^{cap}$ determined by the upper-limit value determination unit 124 to the small cell base station 200. The upper-limit value information means the upper-limit value $I^{cap}$ or an index thereof. In the following description, it is assumed that the upper-limit value $I^{cap}$ per se is used as upper-limit value determination information. In the first embodiment, the wired communication unit 140 serves as a transmitter configured to transmit the upper-limit value information to the small cell base station 200.

(1.2.2) Configuration of Small Cell Base Station

Figure 3:
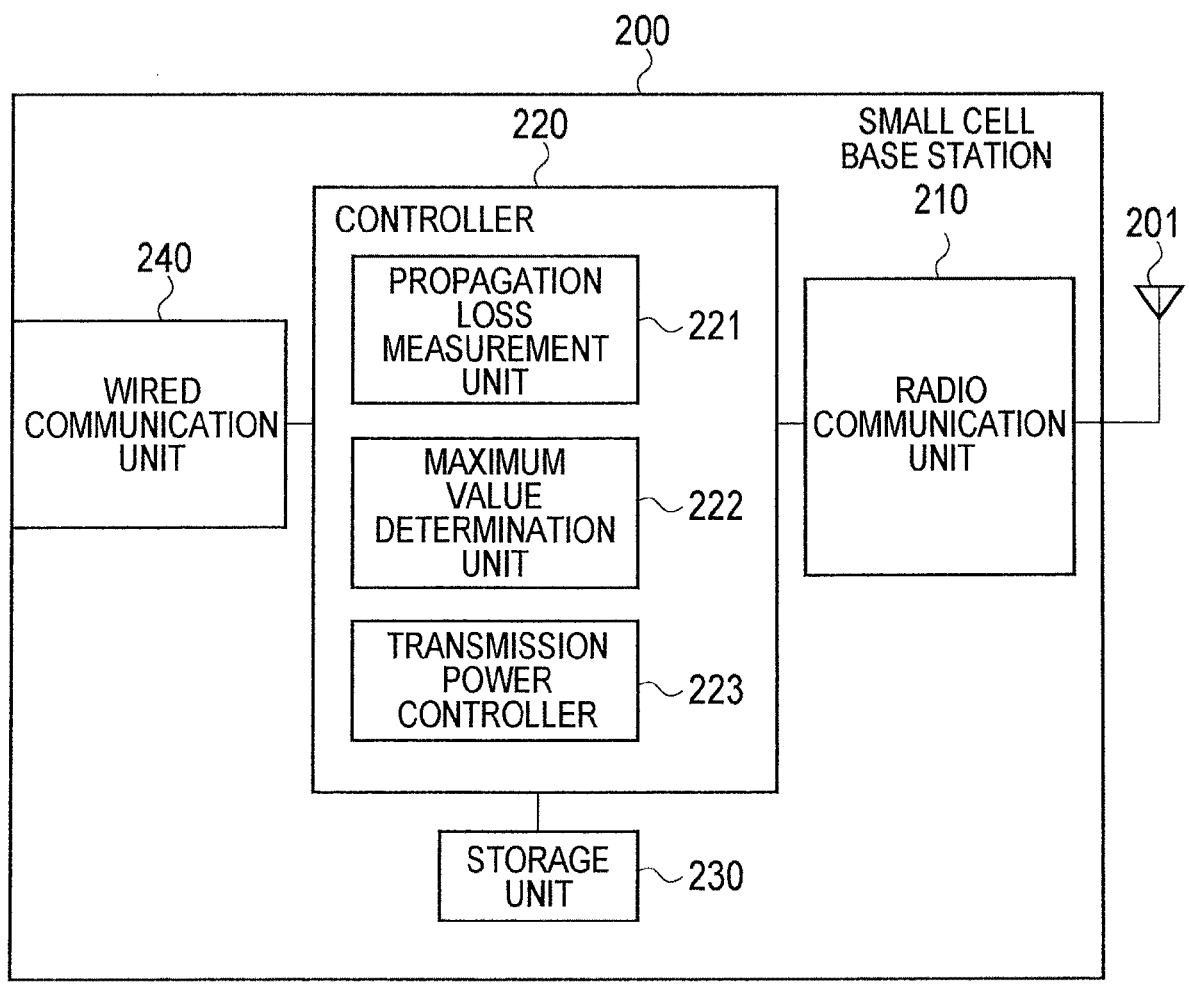
FIG. 3 is a block diagram showing a configuration of the small cell base station according to the first embodiment.

FIG. 3 is a block diagram showing a configuration of the small cell base station 200.

As shown in FIG. 3, the small cell base station 200 includes an antenna unit 201, a radio communication unit 210, a controller 220, a storage unit 230, and a wired communication unit 240.

The radio communication unit 210 is formed of, for example, a radio frequency (RF) circuit and a base band (BB) circuit and transmits and receives a radio signal to and from the radio terminal 300. In addition, the radio communication unit 210 performs coding and modulation of a transmission signal and demodulation and decoding of a reception signal.

The controller 220 is configured of, for example, a CPU and controls various functions included in the small cell base station 200. The storage unit 230 is configured of, for example, a memory and stores various pieces of information to be used for controlling the small cell base station 200. The wired communication unit 240 performs communications with the large cell base station 100 through the core network 10. In the first embodiment, the wired communication unit 240 serves as a receiver configured to receive upper-limit value information.

The controller 220 includes a propagation loss estimation unit 221, a maximum value determination unit 222, and a transmission power controller 223.

The propagation loss estimation unit 221 estimates a propagation loss value $PL_{UP}$ indicating a propagation loss from the radio terminal 300 to the large cell base station 100. The method of estimating the propagation loss value $PL_{UP}$ is described later in detail.

The maximum value determination unit 222 determines a maximum value $p^{MAX}$ of the transmission power of the radio terminal 300 based on the upper-limit value information (upper-limit value $I^{cap}$) which is received by the wired communication unit 240 and the propagation loss value $PL_{UP}$ which is estimated by the propagation loss estimation unit 221. The maximum value $p^{MAX}$ means herein a maximum value of the transmission power per resource block (RB). The method of determining the maximum value $p^{MAX}$ is described later in detail.

The transmission power controller 223 controls the transmission power of the radio terminal 300 so as not to exceed the maximum value $p^{MAX}$ which is determined by the maximum value determination unit 222. Specifically, the transmission power controller 223 determines the transmission power of the radio terminal 300 so as not to exceed the maximum value $p^{MAX}$ and creates a notification of the determined transmission power. The radio communication unit 210 transmits the notification of the transmission power to the radio terminal 300.

It should be noted that the radio terminal 300 which receives the notification of the transmission power transmits a radio signal with the transmission power according to the notification.

(1.2.3) Configuration of Upper-Level Device

Figure 4:
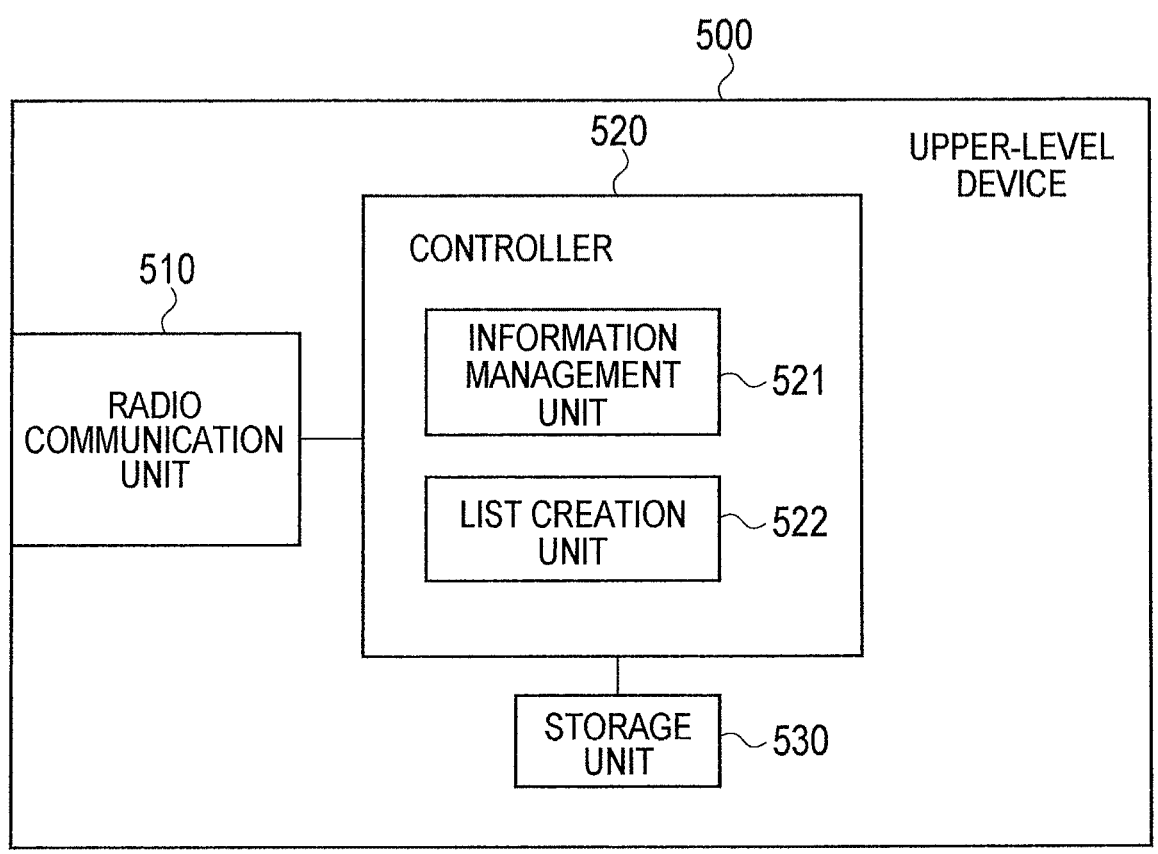
FIG. 4 is a block diagram showing a configuration of an upper-level device according to the first embodiment of the present invention.

FIG. 4 is a block diagram showing a configuration of the upper-level device 500.

As shown in FIG. 4, the upper-level device 500 includes a wired communication unit 510, a controller 520, and a storage unit 530.

The wired communication unit 510 performs communications with the large cell base station 100 and the small cell base station 200 through the core network 10. The controller 520 is formed of, for example, a CPU and controls various functions included in the upper-level device 500. The storage unit 530 is configured of, for example, a memory and stores various pieces of information to be used for controlling the upper-level device 500.

The storage unit 530 stores information on an installation status of the small cell base station 200 and information on a communication status of the small cell base station 200. The information on the installation status of the small cell base station 200 includes information on the number of the small cell base stations 200 within the large cell LC. The information on the communication status of the small cell base station 200 inch ides information specifying the small cell base station 200 in connection with the radio terminal 300 among all the small cell base stations 200 within the large cell LC.

The controller 520 includes an information management unit 521 and a list creation unit 522.

The information management unit 521 manages information which is stored in the storage unit 530. Specifically, the information management unit 521 creates information to be stored in the storage unit 530 and updates information which is stored in the storage unit 530. The information which is stored in the storage ink 530 is periodically updated.

The list creation unit 522 creates a list containing the information on the small cell base station 200 in connection with the radio terminal 300 among all the small cell base stations 200 within the large cell LC based on the information on the communication status of the small cell base station 200. Alternatively, when the information on the communication status is not obtainable, the list creation unit 522 creates a list containing information on all the small cell base stations 200 within the large cell LC based on the information on the installation information of the small call base station 200. The wired communication unit 510 transmits the created list to the large cell base station 100.

The information management unit 521 and the list creation unit 522 manage and update the list by the following method, for example. Specifically, the information management unit 521 and the list creation unit 522 manage the list by one of methods in which (a) a cell ID of the small cell base station 200 adjacent to the large cell base station 100 is notified from the large cell base station 100 to the upper-level device 500 and in which (b) a cell ID of the large cell base station 100 adjacent to the small cell base station 200 is notified from the small cell base station 200 to the upper-level device 500. The large cell base station 100 and the small cell base station 200 detect which cell (a base station) is adjacent thereto by using a measurement report transmitted from the radio terminal in order to allow handover to be performed and hold the list of the adjacent base stations. The upper-limit device 500 is involved in the handover. Thus, the upper-limit device 500 can see that the handover is performed from which cell to which cell. For this reason, after the handover, the upper-limit device 500 can hold the list indicating that which cell is adjacent to which cell. It should be noted that the upper-level device 500 measures the communication status of the small cell base station 200 so as to know the small cell base station to which the radio terminal is connected.

(1.3) Operation of Radio Communication System

Hereinafter, operation patterns 1 to 4 of the radio communication system 1 according to the first embodiment are described. The operation patterns 1 to 4 can be performed individually and also performed by being switched between the operation patterns 1 to 4 as needed.

(1.3.1) Operation Pattern 1

Figure 5:
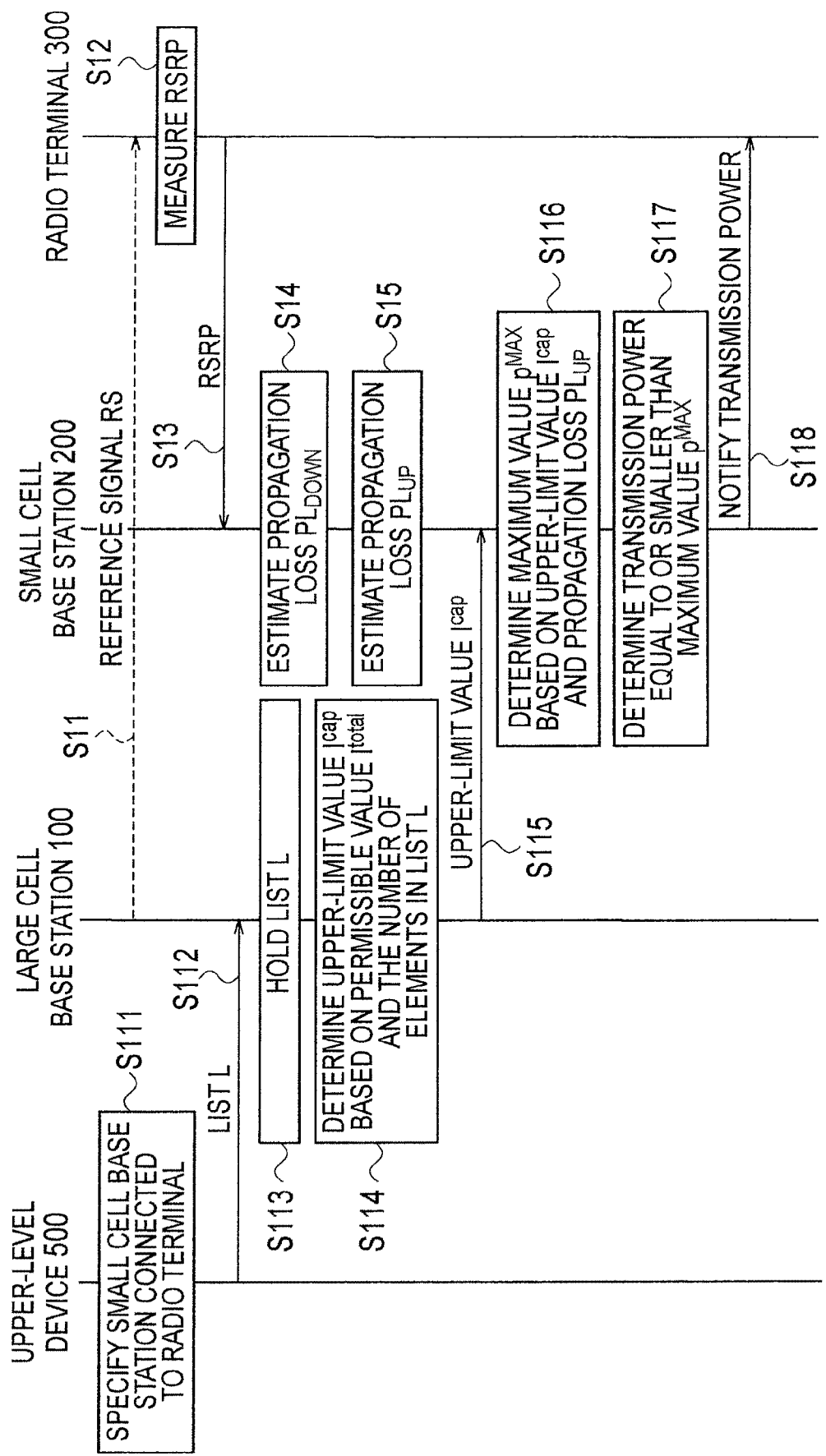
FIG. 5 is a sequence diagram showing an operation pattern 1 according to the first embodiment of the present invention.

FIG. 5 is a sequence diagram showing the operation pattern 1.

The operation includes operations (steps S11 to S15) for estimating a propagation loss value $PL_{UP}$ and other operations (steps S111 to S118). The operations of steps S111 to S118 are periodically performed. The operations of steps S11 to S15 are performed periodically or every time a trigger is generated.

Steps S111 to S118 are described below.

At step S111, the list creation unit 522 of the upper-level device 500 creates a list L containing information on the small cell base station 200 in connection with the radio terminal 300 among all the small cell base stations 200 within the large cell LC based on the information on a communication status of the small cell base station 200.

At step S112, the wired communication unit 510 of the upper-level device 500 transmits the list L created by the list creation unit 522 to the large cell base station 100. The wired communication unit 140 of the large cell base station 100 receives the list L through the core network 10. The storage unit 130 of the large cell base station 100 stores the list L (step S113).

At step S114, the upper-limit value determination unit 124 of the large cell base station 100 determines an upper-limit value $I^{cap}$ for each small cell base station 200 based on the permissible value $I^{total}$ and the number of the small cell base stations (i.e., the number of elements in the list L). As shown in the equation (1), used herein is an approach in which the permissible value $I^{total}$ is divided equally by the number of base stations (the number of elements in the list L) and the divided value is used as the upper-limit value $I^{cap}$.

[Formula 1]

$$I^{cap}=I^{total}/\text{Number of Elements in List L} \qquad (1)$$

In this manner, the upper-limit value $I^{cap}$ of an interference power density from one radio terminal 300 is determined for each of the small cell base stations 200 within the large cell LC.

At step S115, the wired communication unit 140 of the large cell base station 100 transmits the information on the upper-limit value $I^{cap}$ which is determined by the upper-limit value determination unit 124 to each small cell base station 200 through the core network 10. The wired communication unit 240 of the small cell base station 200 receives the information on the upper-limit value $I^{cap}$ through the core network 10.

At step S116, the maximum value determination unit 222 of the small cell base station 200 determines a maximum value $p^{MAX}$ of the transmission power density of the radio terminal 300 according to the following equation (2) using the information on the upper-limit value $I^{cap}$ which is received by the wired communication unit 240 and the propagation loss value $PL_{UP}$ (path-loss: a combination of range attenuation, shadowing loss, and planimetric insertion loss) from the radio terminal 300 to the small cell base station 200.

[Formula 2]

$$p^{MAX}=I^{cap}\times PL_{UP} \qquad (2)$$

At step S117, the transmission power controller 223 of the small cell base station 200 determines the transmission power of the radio terminal 300 so that the transmission power density would be equal to or smaller than the maximum value $p^{MAX}$. At step S118, the radio communication unit 210 of the small cell base station 200 transmits a notification of the transmission power which is obtained from the transmission power controller 223 to the radio terminal 300. On receiving the notification, the radio terminal 300 transmits a radio signal to the small cell base station 200 with the transmission power according to the notification.

Steps S11 to S15 are described below.

The radio communication unit 110 of the large cell base station 100 periodically transmits a reference signal (RS) (step S11). On receiving the reference signal RS, the radio terminal 300 measures reference signal received power (RSRP) of the reference signal RS (step S12) and notifies the measured RSRP to the small cell base station 200 which is connected thereto (step S13). The radio communication unit 210 of the small cell base station 200 receives the RSRP from the radio terminal 300.

At step S14, the propagation loss estimation unit 221 of the small cell base station 200 calculates a propagation loss value $PL_{DOWN}$ from the large cell base station 100 to the radio terminal 300 according to the following equation (3) based on the transmission power of the reference signal of the large cell base station 100 and the RSRP notified by the radio terminal 300.

$$\text{Propagation Loss Value } PL_{DOWN} = \text{Transmission Power of Reference Signal of Large Cell Base Station } 100/\text{RSRP} \quad (3)$$

It is assumed in this equation that the transmission power of the reference signal of the large cell base station 100 is already known in the small cell base station 200. However, if unknown, the maximum value of the transmission power of the reference signal of the large cell base station 100 is used.

At step S15, the propagation loss estimation unit 221 of the small cell base station 200 estimates a propagation loss value $PL_{UP}$ from the radio terminal 300 to the large cell base station 100. The propagation loss value $PL_{DOWN}$ obtained at step S14 is a downlink propagation loss from the large cell base station 100 to the radio terminal 300. When frequency bands to be used in the uplink and downlink are close to each other, the uplink propagation loss value $PL_{UP}$ approximates to the downlink propagation loss value $PL_{DOWN}$. When the frequency bands to be used are largely different, the downlink propagation loss value $PL_{DOWN}$ is corrected and the corrected value is used as the uplink propagation loss value $PL_{UP}$.

(1.3.2) Operation Pattern 2

Figure 6:
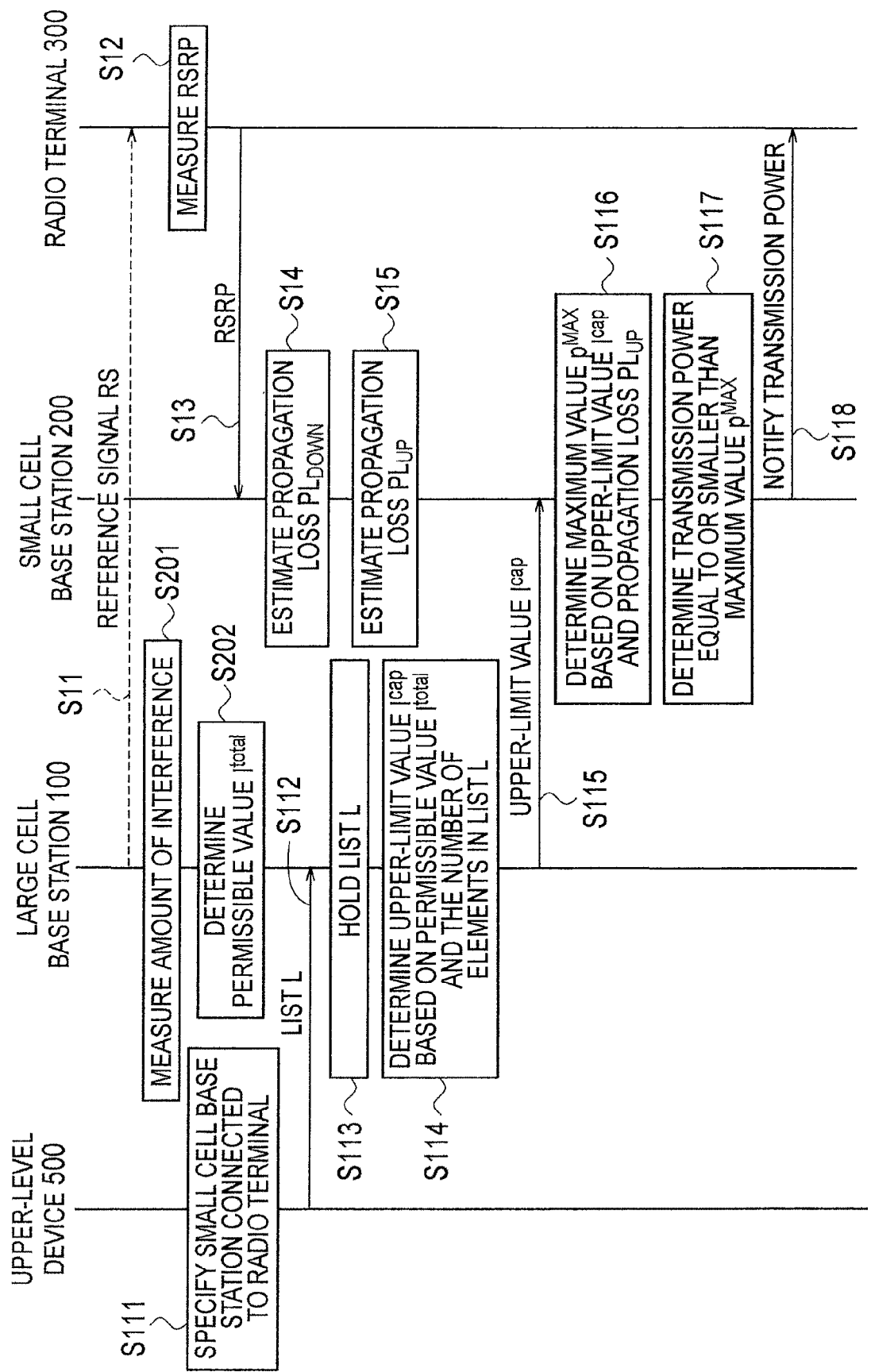
FIG. 6 is a sequence diagram showing an operation pattern 2 according to the first embodiment of the present invention.

FIG. 6 is a sequence diagram showing the operation pattern 2. In the operation pattern 2, the description is mainly given to portions different from those of the operation pattern 1. The operation pattern 1 is the operation when the permissible value $I^{total}$ is fixed, while the operation pattern 2 is the operation when the permissible value $I^{total}$ is variable.

At step S201, the interference measurement unit 122 of the large cell base station 100 measures a total amount of interference which is received by the large cell base station 100. The total amount of interference means herein an amount of interference from the radio terminal 300 and also an amount of interference from other interference sources.

At step S202, the permissible value determination unit 123 of the large cell base station 100 determines a permissible value $I^{total}$ based on the total amount of interference which is measured by the interference measurement unit 122. For example, the permissible value determination unit 123 determines, as the permissible value $I^{total}$, a portion (x %) of the total amount of interference which is received by the large cell base station 100.

The operation hereinafter is same as that of the operation pattern 1.

(1.3.3) Operation Pattern 3

Figure 7:
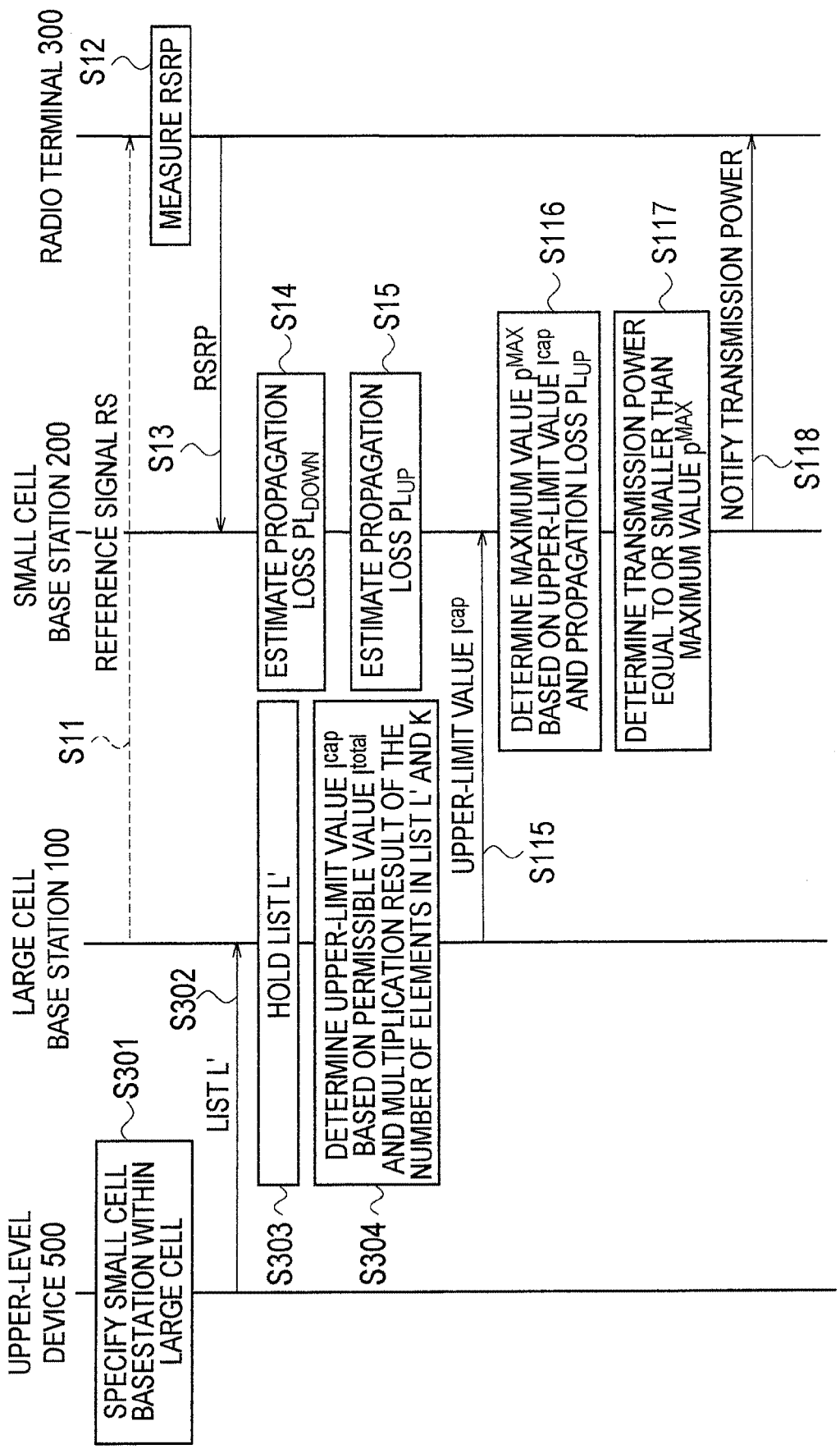
FIG. 7 is a sequence diagram showing an operation pattern 3 according to the first embodiment of the present invention.

FIG. 7 is a sequence diagram showing the operation pattern 3. The operation pattern 3 is performed when only a list L' of the small cell base stations 200 within the large cell LC is obtainable regardless of whether or not the connected radio terminal 300 is present.

At step S301, the list creation unit 522 of the upper-level device 500 creates a list L' containing information on all the small cell base stations 200 within the large cell LC based on the information on the installation status of the small cell base station 200.

At step S302, the wired communication unit 510 of the upper-level device 500 transmits the list L' which is created by the list creation unit 522 to the large cell base station 100. The wired communication unit 140 of the large cell base station 100 receives the list L' through the core network 10. The storage unit 130 of the large cell base station 100 stores the list L' (step S303).

At step S304, the upper-limit value determination unit 124 of the large cell base station 100 determines an upper-limit value $I^{cap}$ for each small cell base station 200 based on the permissible value $I^{total}$ and the number of the small cell base stations (i.e., the number of elements in the list L'). In the equation (1), "the number of elements in the list L" is replaced by "k×the number of elements in the list L'", where k is a coefficient indicating a proportion of the small cell base stations in connection with radio terminal among the small cell base stations in the list L'. When a correct value of k is not obtainable, a value to be determined by the system is used.

The operation hereinafter is same as that of the operation pattern 1.

(1.3.4) Operation Pattern 4

Figure 8:
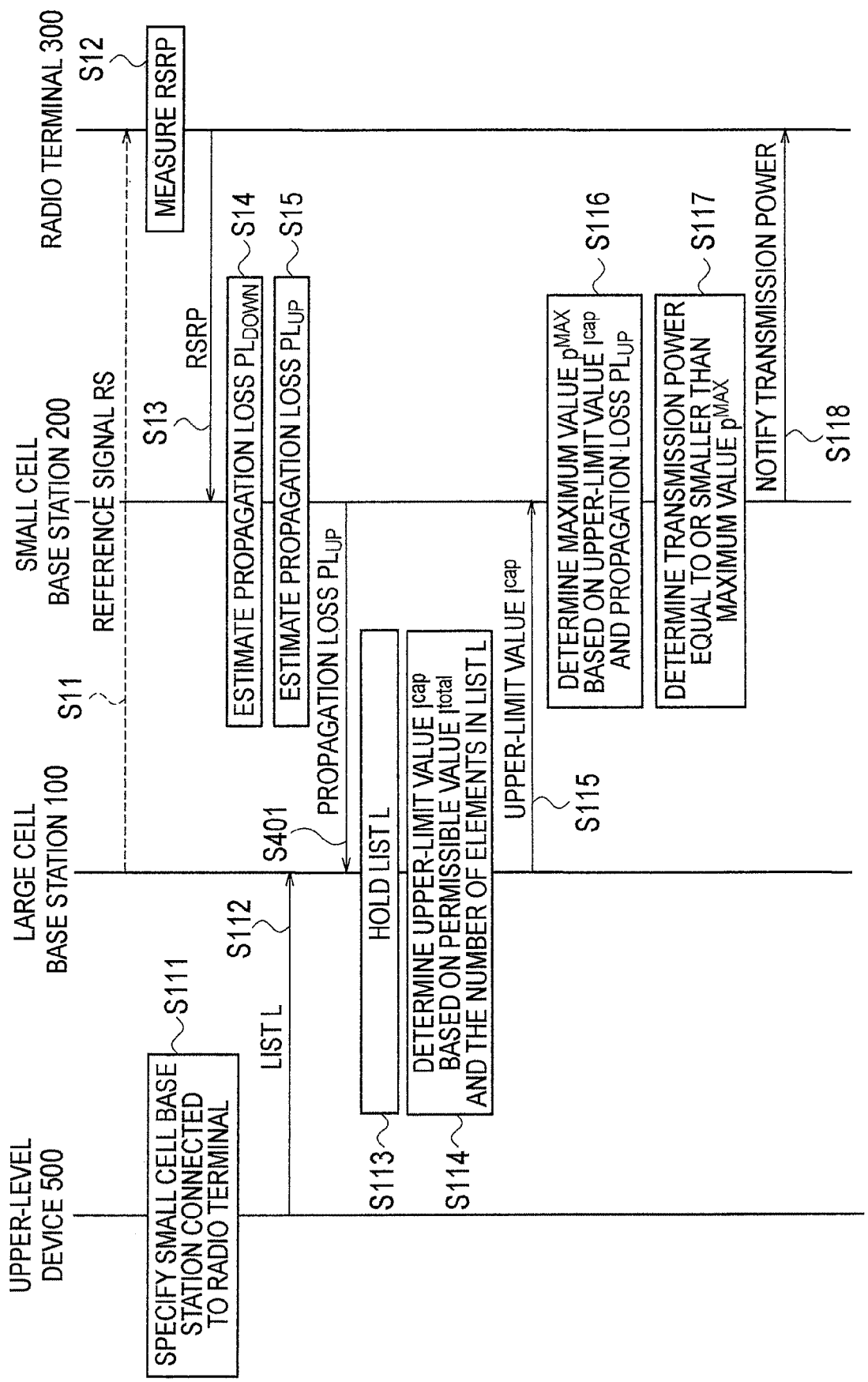
FIG. 8 is a sequence diagram showing an operation pattern 4 according to the first embodiment of the present invention.

FIG. 8 is a sequence diagram showing the operation pattern 4. In the operation pattern 4, the description is mainly given to portions different from those of the operation pattern 1.

When the maximum value $p^{MAX}$ is determined by the equation (2), the maximum value $p^{MAX}$ becomes larger as a distance of the radio terminal 300 from the large cell base station 100 is longer. As a result, an inequality of the maximum value $p^{MAX}$ (i.e., an inequality of a communication rate) is caused between the radio terminals 300. In general, from a viewpoint of keeping the communication rate of the radio terminal constant, it is better that the maximum value $p^{MAX}$ is larger. The problem of the inequality of the maximum value $p^{MAX}$ can be solved if a control signal can be transmitted from the small cell base station 200 to the large cell base station 100. The operation pattern 4 is performed to secure the equality of the communication rate.

All the small cell base stations 200 within the large cell LC transmit a propagation loss value $PL_{UP}$ between the connected radio terminal 300 and the large cell base station 100 to the large cell base station 100 (step S401). When multiple radio terminals 300 are connected to one small cell base station 200, a mean value of the propagation loss values $PL_{UP}$ is transmitted to the large cell base station 100.

At step S402, the upper-limit value determination unit 124 of the large cell base station 100 determines an upper-limit value $I^{cap}$ which is notified to each small cell base station i according to the following equation (4).

[Formula 3]

$$I^{cap} = I^{total} \times \sum_{j \in L} \frac{1}{PL_{UP}(j)} \Big/ PL_{UP}(i) \times (\text{Number of Elements in List } L) \quad (4)$$

where $PL_{UP}(i)$ is a propagation loss value $PL_{UP}$ notified from the small cell base station i and $\Sigma$ means the sum of the elements j other than i in the list L (the same is true for the equation (5) to be shown later).

When the upper-limit value $I^{cap}$ is determined by the equation (4), the maximum value $p^{MAX}$ of the transmission power density of one radio terminal 300 connected to the small cell base station i can be obtained by the following equation (5).

[Formula 4]
$$p^{MAX}(i) = I^{cap}(i) \times PL_{UP}(i) = \qquad (5)$$
$$I^{total} \times \sum_{j \in Li} \frac{1}{PL_{UP}(j)} \bigg/ \text{Number of Elements in List } L$$

In this manner, the maximum value $p^{MAX}$ becomes constant regardless of the small cell base station. As a result, the equality of the maximum value $p^{MAX}$ of the transmission power density of the radio terminal 300 can be secured.

As described above, in the operation pattern 4, the small cell base station 200 transmits the propagation loss value $PL_{UP}$ to the large cell base station 100 and the upper-limit value determination unit 124 of the large cell base station 100 determines the upper-limit value $I^{cap}$ based on the permissible value $I^{total}$, the number of the small cell base stations, and the propagation loss value $PL_{UP}$. According to this operation, the upper-limit value $I^{cap}$ can be determined for each small cell base station 200 so that the maximum value $p^{MAX}$ would be kept constant between the radio terminals 300.

(1.4) Effects of First Embodiment

In the present embodiment, the large cell base station 100 determines an upper-limit value $I^{cap}$ based on a permissible value $I^{total}$ and the number of small cell base stations. The small cell base station 200 determines a maximum value $p^{MAX}$ based on the upper-limit value $I^{cap}$ and a propagation loss value $PL_{UP}$ and controls the transmission power of the radio terminal 300 so as not to exceed the determined maximum value $p^{MAX}$. As a result, even when the number of the small cell base stations 200 within the large cell LC is changed, the total amount of interference from the radio terminal 300 to the large cell base station 100 can be kept equal to or smaller than the permissible value $I^{total}$. Thus, decrease of the transmission rate of the radio terminal 400 connected to the large cell base station 100 can be suppressed.

In the embodiment, the upper-limit value determination unit 124 of the large cell base station 100 obtains the upper-limit value $I^{cap}$ by dividing the permissible value $I^{total}$ by the number of the small cell base stations 200 in connection with the radio terminal 300 among all the small cell base stations 200 within the large cell LC. As a result, the upper-limit value $I^{cap}$ is determined while excluding the small cell base station 200 which is not in connection with the radio terminal 300. Thus, the upper-limit value $I^{cap}$ is prevented from being excessively small. It should be noted that the upper-limit value determination unit 124 may equally or unequally divide the permissible value $I^{total}$.

In the embodiment, the upper-level device 500 manages information on the installation status of the small cell base station 200 and information on the communication status of the small cell base station 200. The acquisition unit 121 of the large cell base station 100 uses a list based on the information which is managed by the upper-level device 500 to acquire the number of all the small cell base stations 200 within the large cell LC or the number of the small cell base stations 200 in connection with the radio terminal 300 among all the small cell base stations 200 within the large cell LC. As a result, the upper-limit value $I^{cap}$ can be determined to be suitable for the real-time communication environment.

In the embodiment, the large cell base station 100 inch ides the interference measurement unit 122 configured to measure the total amount of interference which is received by the large cell base station 100 and the permissible value determination unit 123 configured to determine the permissible value $I^{total}$ based on the measured value obtained by the interference measurement unit 122. Thus, the permissible value $I^{total}$ can be determined to be suitable for the real-time communication environment.

In the embodiment, the upper-limit determination unit 124 determines the upper-limit value $I^{cap}$ using a result of dividing the permissible value $I^{total}$ by a multiplication result of the number of all the small cell base stations 200 within the large cell LC and a coefficient k. Thus, even when the information of the communication status (the information of the connected radio terminal 300) cannot be obtained in the upper-level device 500, the upper-limit value $I^{cap}$ can be properly set.

In the embodiment, the upper-limit value determination unit 124 determines the upper-limit value $I^{cap}$ based on the permissible value $I^{total}$, the number of the small cell base stations, and the propagation loss value $PL_{UP}$. Thus, the upper-limit value $I^{cap}$ can be determined for each small cell base station 200 so that the maximum value $p^{MAX}$ would be kept constant between the radio terminals 300.

(2) Second Embodiment

Hereinafter, a second embodiment of the present invention is described. In the above-described first embodiment, the large cell base station 100 determines the upper-limit value $I^{cap}$ and notifies the small cell base station 200 of the upper-limit value $I^{cap}$. However, in the second embodiment, an upper-level device 500 determines an upper-limit value $I^{cap}$ and notifies a small cell base station 200 of the upper-limit value $I^{cap}$. In other words, in the second embodiment, the upper-level device 500 configures a network side device.

The second embodiment is described below focusing on portions different from those of the first embodiment.

(2.1) Configuration of Upper-Level Device

Figure 9:
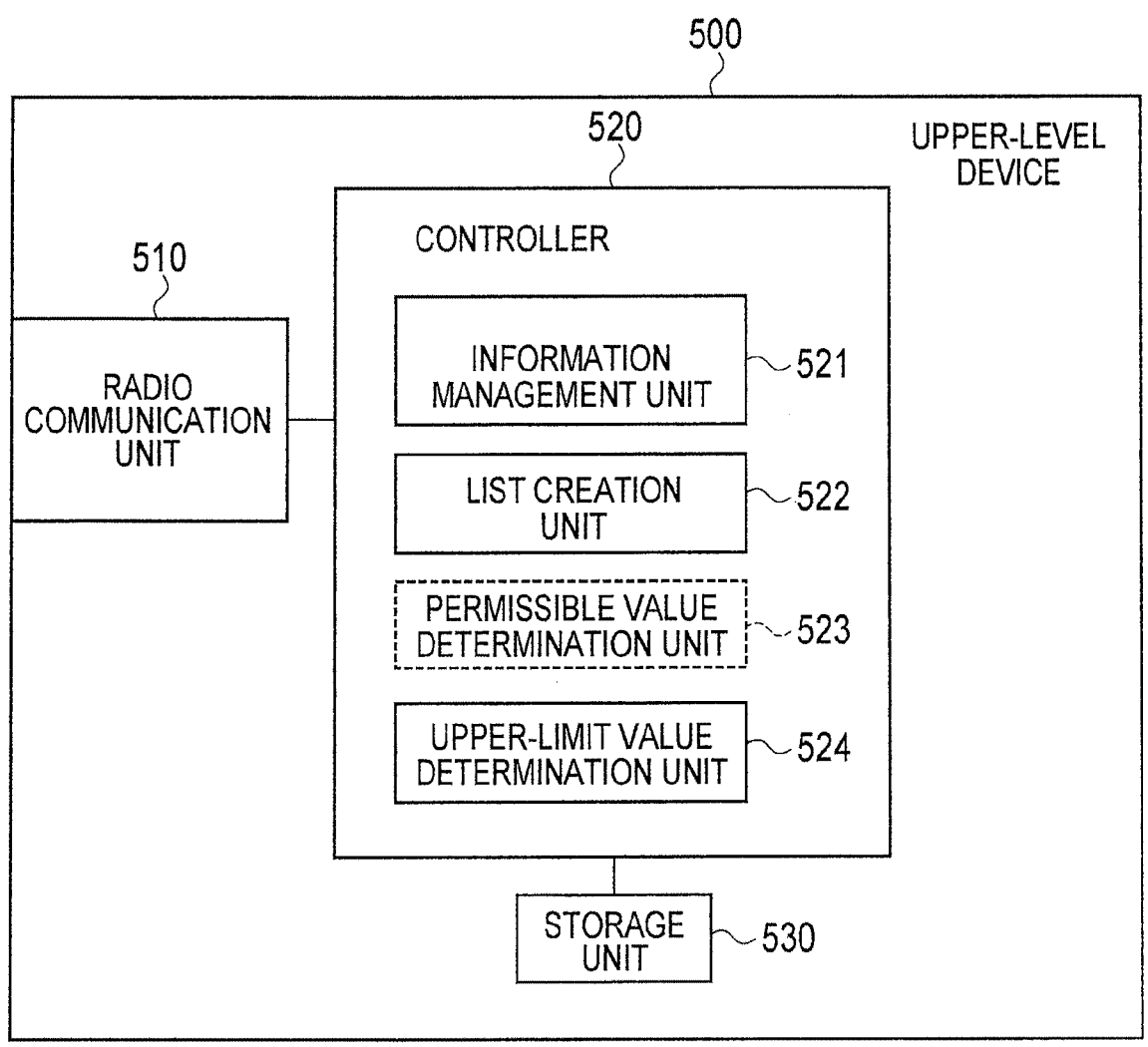
FIG. 9 is a block diagram showing the configuration of an upper-level device according to the second embodiment of the present invention.

FIG. 9 is a block diagram showing a configuration of the upper-level device 500 according to the second embodiment.

As shown in FIG. 9, the upper-level device 500 according to the second embodiment is different from that of the first embodiment in that a controller 520 has an upper-limit value determination unit 524. When a permissible value $I^{total}$ fixed, a storage unit 530 stores a permissible value $I^{total}$ in advance. The upper-limit value determination unit 524 determines an upper-limit value $I^{cap}$ according to the equation (2). When the permissible value $I^{cap}$ is variable, the controller 520 may include a permissible value determination unit 523. The other configurations are same as those of the first embodiment.

(2.2) Operation of Radio Communication System

Hereinafter, operation patterns 1 and 2 of a radio communication system 1 according to the second embodiment are described. The operation patterns 1 and 2 can be performed individually and also performed by being properly switched between the operation patterns 1 and 2.

(2.2.1) Operation Pattern 1

Figure 10:
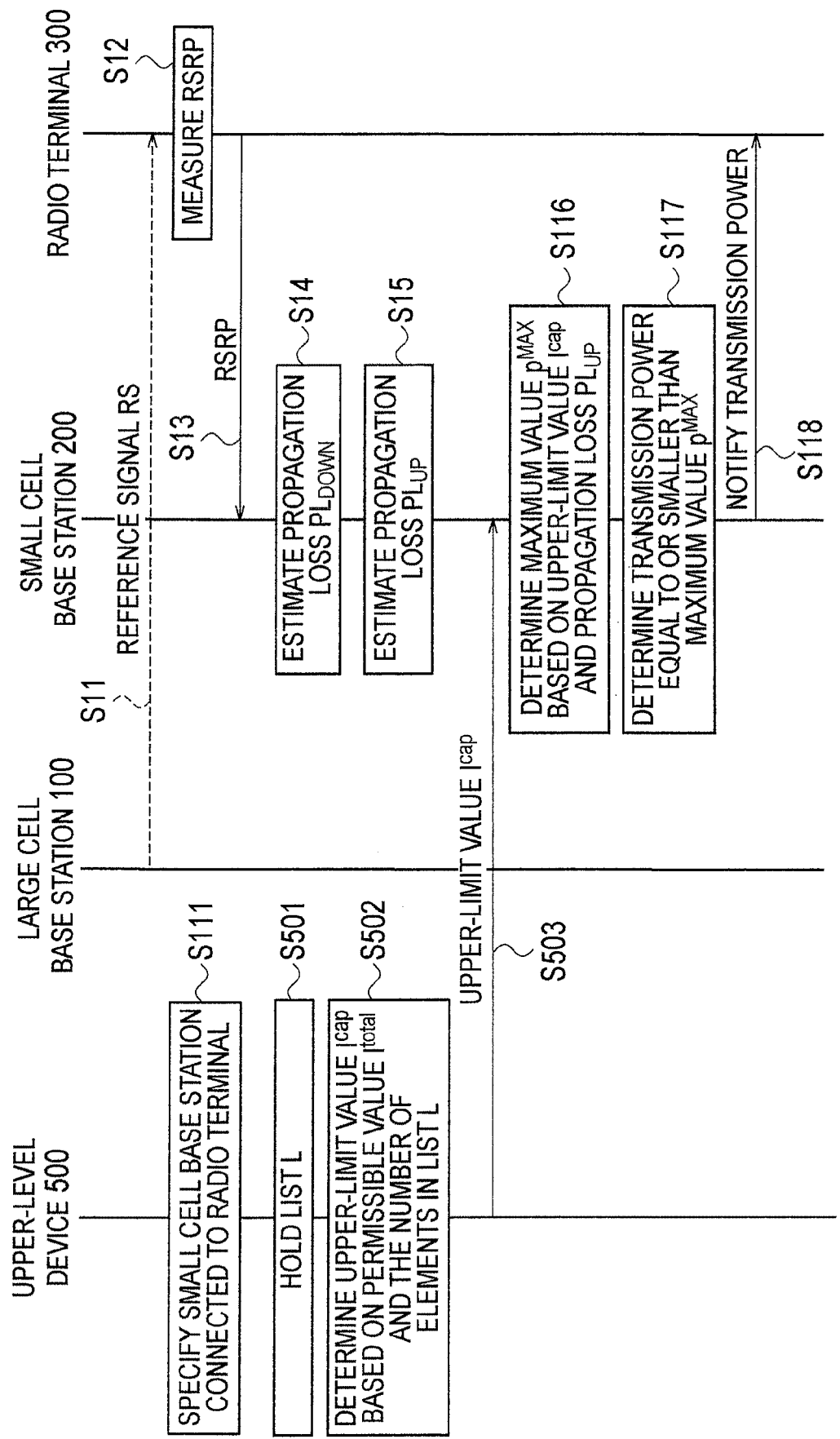
FIG. 10 is a sequence diagram showing an operation pattern 1 according to the first embodiment of the present invention.

FIG. 10 is a sequence diagram showing the operation pattern 1 according to the second embodiment. In the operation pattern 1, it is assumed that a permissible value $I^{total}$ is fixed.

At step S111, a list creation unit 522 of the upper-level device 500 creates a list L containing information on the small cell base station 200 having a connected radio terminal 300 among all the small cell base stations 200 within a large cell LC based on information on a communication status of the small cell base station 200.

At step S501, the storage unit 530 of the upper-level device 500 stores the list L created by the list creation unit 522.

At step S502, the upper-limit value determination unit 524 of the upper-level device 500 determines the upper-limit value $I^{cap}$ for each small cell base station based on the permissible value $I^{total}$ and the number of the small cell base stations (i.e., the number of elements in the list L). Used herein is an approach in which the permissible value $I^{total}$ is divided equally by the number of the small cell base stations (the number of elements in the list L) and the divided value is used as the upper-limit value $I^{cap}$ as shown in equation (1). In this manner, the upper-limit value $I^{cap}$ of an interference power density from one radio terminal 300 is determined in the upper-level device 500 for each of the small cell base stations 200 present in the large cell LC.

At step S503, a wired communication unit 510 of the upper-level device 500 transmits the information on the upper-limit value $I^{cap}$ determined by the upper-limit value determination unit 524 to each small cell base station 200 through a core network 10. The wired communication unit 240 of the small cell base station 200 receives the information on the upper-limit value $I^{cap}$ through the core network 10.

The operation thereafter is same as that of the operation pattern 1 according to the first embodiment.

(2.2.2) Operation Pattern 2

FIG. 11 is a sequence diagram showing the operation pattern 2 according to the second embodiment. In the operation pattern 2, it is assumed that a permissible value $I^{total}$ is variable.

At step S201, the interference measurement unit 122 of the large cell base station 100 measures a total amount of interference which is received by the large cell base station 100. The total amount of interference means herein an amount of interference from the radio terminal 300 and an amount of interference from other interference sources.

At step S601, the wired communication unit 140 of the large cell base station 100 transmits the measured value obtained by the interference measurement unit 122 to the upper-level device 500 through the core network 10. The wired communication unit 510 of the upper-level device 500 receives the measured value.

At step S602, the permissible value determination unit 523 of the upper-level device 500 determines the permissible value $I^{total}$ based on the notified total amount of interference. For example, the permissible value determination unit 123 determines the permissible value $I^{total}$ as a portion (x %) of the total amount of interference which is received by the large cell base station 100.

At step S603, the upper-limit value determination unit 524 of the upper-level device 500 determines the upper-limit value $I^{cap}$ for each small cell base station 200 based on the permissible value $I^{total}$ determined by the permissible value determination unit 523 and the number of the small cell base stations (i.e., the number of elements in the list L).

The operation hereinafter is same as that of the operation pattern 1 according to the second embodiment.

(2.3) Effect of Second Embodiment

According to the present embodiment, the following effect can be obtained in addition to the effects obtained in the first embodiment. Specifically, the number of processes to be added to the large cell base station 100 can be reduced as compared with that of the first embodiment.

(3) Other Embodiments

The present invention has been described by using the above-described embodiments. However, it should not be understood that the description and the drawings which constitute one part of the disclosure are intended to limit the present invention. Various alternative embodiments, examples, and operational techniques will be apparent for those who are skilled in the art from this disclosure.

For example, in the first embodiment, the large cell base station 100 determines the upper-limit value $I^{cap}$ and notifies the small cell base station 200 of the upper-limit value $I^{cap}$, while in the second embodiment, the upper-level device 500 determines the upper-limit value $I^{cap}$ and notifies the small cell base station 200 of the upper-limit value $I^{cap}$. However, the configuration may be such that the large cell base station 100 determines the upper-limit value $I^{cap}$ and the upper-level device 500 notifies the small cell base station 200 of the upper-limit value $I^{cap}$. Alternatively, the configuration may be such that the upper-level device 500 determines the upper-limit value $I^{cap}$ and the large cell base station 100 notifies the small cell base station 200 of the upper-limit value $I^{cap}$. As described above, the network side device for achieving the above-described transmission power control method is formed of the large cell base station or the upper-level device.

In the above-described embodiments, the specifications of the base station communications are not particularly described and, thus, are described below.

The large cell base station 100 is connected to the adjacent large cell base station through a leased line and, thus, is capable of performing base station communications utilizing the high-speed leased line. This interface between the base stations is referred to as an X2 interface. An overload indicator (OI) which is information showing an amount of interference which is received by the base station in the uplink can be transmitted and received between the base stations through the X2 interface.

The large cell base station 100 controls transmission power in the uplink based on the received OI. On the other hand, the small cell base station 200 is connected to the core network 10 of a carrier through a public line such as ADSL or FTTH. Also, since the small cell base station 200 is installed in any place, it is difficult that the small cell base stations are connected by an exclusive line like the case of the large cell base station 100.

For this reason, even when the small cell base station 200 can receive the OI, the OI goes through the public line. Thus, it is likely that a transmission delay time of the OI becomes longer. However, the transmission power control method in the uplink using the OI in the case where a major difference exists between the transmission delay times is generally unknown.

In the above-described embodiments, information on a high-speed time variation of a communication path is not used. Thus, it is expected that the embodiments are effective for the reception delay of the control signal in the small cell base station. Consequently, such a problem can also be solved.

All things considered, it should be understood that the present invention includes various embodiments and the like not described herein. Thus, the present invention is specified only with matters specifying the present invention in the claims reasonably derived from the disclosure.

What is claimed is:

1. A radio communication system in which
a plurality of small cell base stations are installed within a large cell formed by a large cell base station and each are configured to form a small cell smaller than the large cell, and the small cell base stations are configured to control transmission powers of radio terminals connected to the small cell base stations, wherein a network side device that is formed of at least one of the large cell base station and an upper-level device of the large cell base station comprises:

an upper-limit value determination unit configured to determine an upper-limit value of an amount of interference which is received by the large cell base station from each of the radio terminals based on a permissible value of a total amount of interference which is received by the large cell base station from the radio terminals and the number of the small cell base stations within the large cell; and a transmitter configured to transmit upper-limit value information indicating the upper-limit value determined by the upper-limit value determination unit to the small cell base stations, and the small cell base stations each comprises:

a receiver configured to receive the upper-limit value information from the network side device;

a maximum value determination unit configured to determine a maximum value of transmission power of a corresponding one of the radio terminals based on the upper-limit value information received by the receiver and a propagation loss value indicating a propagation loss from the corresponding one of the radio terminals to the large cell base station; and a transmission power controller configured to control transmission power of the corresponding one of the radio terminals so the transmission power does not exceed the maximum value determined by the maximum value determination unit.

2. The radio communication system according to claim 1, wherein the upper-limit value determination unit determines, as the upper-limit value, a result of dividing the permissible value of the total amount of interference by the number of the small cell base stations having a connected radio terminal among all the small cell base stations within the large cell.

3. The radio communication system according to claim 1, wherein the upper-level device manages information on an installation status of the small cell base stations and information on a communication status of the small cell base stations, and the network side device includes an acquisition unit which acquires information on the number of the small cell base stations within the large cell using the information which is managed by the upper-limit device.

4. The radio communication system according to claim 1, wherein the large cell base station includes an interference measurement unit which measures the total amount of interference which is received by the large cell base station, and the network side device includes a permissible value determination unit which determines the permissible value of the total amount of interference based on a measured value obtained by the interference measurement unit.

5. The radio communication system according to claim 1, wherein the upper-limit value determination unit determines, as the upper-limit value, a result of dividing the permissible value of the total amount of interference by a multiplication result of the number of all the small cell base stations within the large cell and a coefficient indicating a proportion of the small cell base station having a connected radio terminal to all the small cell base stations within the large cell.

6. The radio communication system according to claim 1, wherein the small cell base stations each transmits the propagation loss value to the network side device, the network side device receives the propagation loss values from the small cell base stations, and the upper-limit value determination unit determines the upper-limit value based on the permissible value of the total amount of interference, the number of the small cell base stations within the large cell, and the propagation loss values received from the small cell base stations.

7. A small cell base station which forms a small cell smaller than a large cell formed by a large cell base station and is installed within the large cell, comprising:

a receiver configured to receive upper-limit value information from a network side device which is formed of at least one of the large cell base station and an upper-level device of the large cell base station;

a maximum value determination unit configured to determine a maximum value of transmission power of a radio terminal based on the upper-limit value information received by the receiver and a propagation loss value indicating a propagation loss from the radio terminal connected to the small cell base station to the large cell base station; and a transmission power controller configured to control transmission power of the radio terminal so that the transmission power does not exceed the maximum value determined by the maximum value determination unit, wherein the upper-limit value information indicates an upper-limit value of an amount of interference which is received by the large cell base station from one radio terminal, and the upper-limit value is determined based on a permissible value of a total amount of interference which is received by the large cell base station from radio terminals connected to the small cell base station within the large cell and the number of small cell base stations within the large cell.

8. A transmission power control method of controlling transmission powers of radio terminals connected to small cell base stations in a radio communication system in which each of the small cell base stations forms a small cell smaller than a large cell formed by a large cell base station and the small cell base stations are installed within the large cell, comprising the steps of:

determining, by a network side device which is formed of at least one of the large cell base station and an upper-level device of the large cell base station, an upper-level value of an amount of interference which is received by the large cell base station from each of the radio terminals based on a permissible value of a total amount of interference which is received by the large cell base station from the radio terminals and the number of the small cell base stations within the large cell; and transmitting upper-limit value information indicating the determined upper-limit value from the network side device to the small cell base stations, and receiving, by the small cell base stations, the upper-limit value information from the network side device;

determining, by the small cell base stations, a maximum value of transmission powers of the respective radio terminals based on the received upper-limit value information and a propagation loss value indicating a propagation loss from the respective radio terminals to the large cell base station; and controlling, by the small cell base stations, transmission power of each of the radio terminals so that the transmission power does not exceed the determined maximum value.

\* \* \* \* \*